US011407941B2

(12) United States Patent
Cao et al.

(10) Patent No.: US 11,407,941 B2
(45) Date of Patent: Aug. 9, 2022

(54) FLUORESCENT NANOMATERIAL AND PREPARATION METHOD AND APPLICATIONS THEREOF

(71) Applicant: INSTITUTE OF PROCESS ENGINEERING, CHINESE ACADEMY OF SCIENCES, Haidian (CN)

(72) Inventors: Hongbin Cao, Haidian (CN); He Zhao, Haidian (CN); Qin Dai, Haidian (CN)

(73) Assignee: INSTITUTE OF PROCESS ENGINEERING, CHINESE ACADEMY OF SCIENCES, Beijing (CN)

( * ) Notice: Subject to any disclaimer, the term of this patent is extended or adjusted under 35 U.S.C. 154(b) by 704 days.

(21) Appl. No.: 16/361,454

(22) Filed: Mar. 22, 2019

(65) Prior Publication Data
US 2019/0300786 A1    Oct. 3, 2019

(30) Foreign Application Priority Data

Mar. 30, 2018    (CN) .......................... 201810295650.1
Mar. 30, 2018    (CN) .......................... 201810299315.9
(Continued)

(51) Int. Cl.
*C09K 11/65*      (2006.01)
*C09K 11/02*      (2006.01)
(Continued)

(52) U.S. Cl.
CPC .............. *C09K 11/65* (2013.01); *C01B 32/15* (2017.08); *B82Y 20/00* (2013.01); *B82Y 40/00* (2013.01);
(Continued)

(58) Field of Classification Search
CPC ............................ C09K 11/025; C09K 11/65
See application file for complete search history.

(56) References Cited

FOREIGN PATENT DOCUMENTS

| CN | 102225897 A | 10/2011 |
|----|-------------|---------|
| CN | 103920433 A | 7/2014  |

(Continued)

OTHER PUBLICATIONS

Sun. Fluorescent vesicles formed by simple surfactants induced by oppositely-charged carbon quantum dots. Chem. Commun., 2016, 52, 12024 (Year: 2016).*

(Continued)

*Primary Examiner* — Matthew E. Hoban
(74) *Attorney, Agent, or Firm* — Woodard, Emhardt, Henry, Reeves & Wagner, LLP

(57) ABSTRACT

The present disclosure provides a fluorescent nanomaterial and a preparation method and applications thereof, and the preparation method comprises: subjecting amphiphilic molecules in a solvent system to an illumination treatment and/or a heat treatment to obtain fluorescent nanomaterials. The preparation of fluorescent nanomaterials provided by the present disclosure is simple in process, simple and easily available in raw materials and requires neither additional addition of a strong acid, a strong alkali, a passivating agent and the like, nor high temperature and high pressure in the preparation process. The whole process is environmentally friendly and pollution-free and the products can be used in various fields.

17 Claims, 9 Drawing Sheets

(30) Foreign Application Priority Data

Mar. 30, 2018 (CN) .......................... 201810299331.8
Mar. 30, 2018 (CN) .......................... 201810299333.7

(51) Int. Cl.

| | |
|---|---|
| *C01B 32/15* | (2017.01) |
| *B82Y 20/00* | (2011.01) |
| *B82Y 40/00* | (2011.01) |

(52) U.S. Cl.

CPC ...... *C01P 2002/01* (2013.01); *C01P 2004/04* (2013.01); *C01P 2004/64* (2013.01); *C01P 2006/60* (2013.01)

(56) References Cited

FOREIGN PATENT DOCUMENTS

| CN | 107353410 A | 11/2017 |
|---|---|---|
| CN | 109456760 A | 3/2019 |

OTHER PUBLICATIONS

Lu. Hydrophobic-carbon-dot-based dual-emission micelle for ratiometric fluorescence biosensing and imaging of Cu2+ in liver cells. Biosensors and Bioelectronics 92 (2017) 101-108. (Year: 2017).*

Chen, 'The Ultra Small Amphiphilic Molecules Vesicles Self Assembly Formation and Mechanism Study' College of Food Science and Biotechnology, 2017, pp. 1-77, Zhejiang Gongshang University, Hangzhouw, 310035, P.R. China.

Ye, Fun, et al., 'Investigation of Micellization and Vesticulation of Conjugated Linoleic acid by self-assembly and self-crosslinking strategy', China Doctoral Dissertation (Dec. 2014), Jiangnan University, pp. 1-100.

* cited by examiner

FLUORESCENT NANOMATERIAL AND PREPARATION METHOD AND APPLICATIONS THEREOF

CROSS-REFERENCE TO RELATED APPLICATIONS

This application claims priority to Chinese Patent Applications No. 201810299331.8, No. 201810295650.1, No. 201810299333.7, No. 201810299315.9, filed on Mar. 30, 2018, the contents of which are incorporated herein in its entirety by reference.

TECHNICAL FIELD

The present disclosure belongs to the field of nanomaterials, and relates to a fluorescent nanomaterial and a preparation method and applications thereof.

BACKGROUND

The synthesis of fluorescent nanomaterials has attracted great attentions due to their low cytotoxicity, good biocompatibility and superior fluorescence performance. And they are widely used in the fields such as sensors, photoelectrocatalysis, luminescent devices, drug delivery, bioimaging and micro/nano reactors.

In one aspect, methods for synthesizing fluorescent carbon nanoparticles (FCNs) are mainly divided into "top-down" methods and "bottom-up" methods. The top-down strategy is based on chemical, electrochemical or physical cracking or degradation of carbonaceous materials. The bottom-up strategy involves the pyrogenic decomposition or carbonization of small organic molecules under high temperature or by stepwise chemical fusion of small aromatic molecules. Unfortunately, most of these methods need to be carried out in a strongly acidic or alkaline environment or a high-temperature and high-pressure environment, and have cumbersome steps.

In another aspect, methods for synthesizing fluorescent vesicles and micelles include: a fluorescent dye and an aggregation-induced emission (AIE) molecule are embedded into the skeleton of a vesicle/micelle or encapsulated in the cavity of a prefabricated vesicle/micelle, and a fluorescent vesicle is induced by the assembly of prepared FCNs and surfactants. For example, related reports have included that vesicles are used to encapsulate fluorescent dyes and anticancer drugs for fluorescence imaging and thermochemotherapy in conjunction with tumor ablation; fluorescent vesicles are prepared by self-assembly of tetraphenylethylene nanoparticles for long-term live cell imaging; and fluorescent micelles are formed by self-assembly of fluorescent block copolymers. However, relevant studies have revealed that only one method (Fluorescent Vesicles Formed by Single Surfactant Induced by Oppositely-Charged Carbon Quantum Dots. 2013 00, 1-3) reported the formation of fluorescent vesicles by surfactants induced by FCNs. Nevertheless, block preparation is very difficult and may even result in morphological transformation of vesicle nanostructures. Moreover, the encapsulated fluorescent dyes have low stability, and the fluorescence intensity of the vesicles/micelles prepared from $\pi$-$\pi$ conjugated or dye-labeled amphiphilic molecules will significantly decrease due to the aggregation-caused quenching (ACQ) effect. In addition, there exist problems such as lengthy reaction, complicated and time-consuming post-treatment, and the use of toxic organic solvents in the preparation process. Of greater significance, the control of the hydrophilic/hydrophobic transition of the fluorescent vesicle/micelle by a simple pretreatment method has not been reported at present, which indicates that practical application is more meaningful.

CN105418947A discloses a program-controlling assembled fluorescent polymer vesicle and a preparation method thereof. Wherein a dynamic micelle is constructed by using choline diacetylene and polyethylene glycol diacetylene as starting materials, and then an enzymatic reaction is carried out between butyrylcholine and the choline diacetylene, and the diacetylenic acid generated from the enzyme reaction and the polyethylene glycol diacetylene can form dynamic vesicles. However, the preparation process of the method is complicated and involves many substances, which may adversely affect the organism.

CN103920433A discloses an inorganic nanocrystalline vesicle-like microsphere and a photochemical synthesis method thereof. The method comprises: illuminating inorganic nanocrystals modified by thiol functional groups to make them assemble in a solvent to obtain vesicle microspheres. However, this method requires prepared nanocrystals for the reaction, and the microreactor does not function to prepare nanomaterials. Moreover, it has cumbersome reaction steps, and cannot be controlled to achieve the effect of transition between hydrophilicity and hydrophobicity.

CN105555833A discloses a fluorescent polymer and a use thereof. Wherein the block copolymers may be amphiphilic and self-assembled into nanoscale micelles, such as a micelle having a hydrophobic core and a hydrophilic shell. In addition, in some cases, the block copolymer may be luminescent or fluorescent and/or biodegradable, making it useful for a variety of biological applications. However, this method requires the use of block copolymers, complicated preparation process and complex purification steps, which limit the expansion of its application.

CN104327851B discloses amphiphilic carbon nano-dots and a preparation method and an application thereof. Wherein the amphiphilic carbon nano-dots are dispersed into nanoparticles of 1-5 nm in a strong polar organic solvent, self-assembled into nano-vesicles in water, self-assembled into hollow nanotubes in a medium polar solvent, or self-assembled into a micro-nano-sized solid sphere aggregate in a non-polar solvent. However, this method also requires nanoparticles as a raw material as well as a heating reaction.

At present, most of the preparation methods of fluorescent nanomaterials have complicated reaction processes, and the additional introduction of fluorescent dye may have an adverse effect on the organism, otherwise it is necessary to introduce prepared nanoparticles. Therefore, developing a novel simple preparation method of fluorescence nanomaterials is of great significance for their applications.

SUMMARY

In view of the deficiencies of the existing technologies, the present disclosure aims to provide a fluorescent nanomaterial and a preparation method and applications thereof.

For the purpose, the present disclosure adopts the following technical solutions:

In the first aspect, the present disclosure provides a preparation method of fluorescent nanomaterials, and the preparation method comprises: subjecting amphiphilic molecules in a solvent system to an illumination treatment and/or a heat treatment to obtain fluorescent nanomaterials.

Preferably, the fluorescent nanomaterials comprise any one selected from the group consisting of fluorescent vesicles, fluorescent micelles, FCNs, and a combination of at least two selected therefrom.

The solvent of the present disclosure is not particularly limited, and generally, water, methanol, ethanol, propylene glycol, glycerin, ethylene glycol, butanol, acetonitrile, ethyl acetate and the like may be used, and a buffer may also be used as the solvent, for example, it may be a phosphate buffer, a carbonate buffer or a perchlorate buffer.

Preferably, the amphiphilic molecules comprise any one selected from the group consisting of a phosphatide, an aliphatic acid, an aliphatic alcohol, an aliphatic amine, an aliphatic aldehyde, a surfactant, a hyperbranched polymer, and a combination of at least two selected therefrom.

Preferably, the phosphatide comprises phosphoglyceride and/or sphingomyelin.

Preferably, the aliphatic acid comprises any one selected from the group consisting of a short-chain aliphatic acid, a medium-chain aliphatic acid, a long-chain aliphatic acid, and a combination of at least two selected therefrom. The short-chain aliphatic acid may be isobutyric acid, butyric acid, isovaleric acid or n-valeric acid and the like, the medium-chain aliphatic acid may be hexanoic acid, 2-oxooctanoic acid, octanoic acid, nonoic acid or decanoic acid and the like, and the long-chain aliphatic acid comprises oleic acid, linoleic acid, linolenic acid, palmitic acid or stearic acid and the like.

Preferably, the aliphatic alcohol is a $C_4$-$C_{22}$ alcohol (may be $C_1$, $C_2$, $C_3$, $C_4$, $C_5$, $C_6$, $C_7$, $C_8$, $C_9$, $C_{10}$, $C_{ii}$, $C_{12}$, $C_{13}$, $C_{14}$, $C_{15}$, $C_{16}$, $C_{17}$, $C_{18}$, $C_{19}$, $C_{20}$, $C_{21}$ or $C_{22}$ and the like), and more specifically, may be one selected from the group consisting of butanol, hexanol, octanol, enanthol, nonanol, and a combination of at least two selected therefrom.

Preferably, the aliphatic amine comprises any one selected from the group consisting of hexamethylenediamine, nonylamine, octylamine, octadecylamine, and a combination of at least two selected therefrom.

Preferably, the aliphatic aldehyde comprises any one selected from the group consisting of valeraldehyde, nonaldehyde, octanaldehyde, and a combination of at least two selected therefrom.

Preferably, the surfactant comprises any one selected from the group consisting of a cationic surfactant, an anionic surfactant, a nonionic surfactant, and a combination of at least two selected therefrom.

Preferably, the cationic surfactant comprises any one selected from the group consisting of an amine-salt-type surfactant, a quaternary-ammonium-salt-type surfactant, a heterocyclic-type surfactant, an onium-salt-type surfactant, and a combination of at least two selected therefrom, and it may be double-alkyl-chain quaternary ammonium cationic surfactant, hexadecyl trimethyl ammonium chloride, dodecyl dimethyl benzyl ammonium chloride or bromohexadecyl pyridine and the like, or a combination of at least two selected therefrom.

Preferably, the anionic surfactant comprises any one selected from the group consisting of a polyacrylamide, a sulfonate, a sulfate, a phosphate, and a combination of at least two selected therefrom.

Preferably, the nonionic surfactant comprises a polyoxyethylene-type surfactant and/or a polyol-type surfactant.

Preferably, the hyperbranched polymer comprises any one selected from the group consisting of hyperbranched aromatic polyether ketone, methyl methacrylate, hyperbranched poly(amine-ester), hyperbranched polyphenyl, poly(ethylene glycol) methyl ether, and a combination of at least two selected therefrom.

Preferably, the amphiphilic molecules are subjected to an illumination treatment to obtain fluorescent vesicles.

Preferably, the fluorescent vesicles have a diameter of 9 nm-10 μm, and may be, for example, 9 nm, 15 nm, 20 nm, 50 nm, 100 nm, 500 nm, 1 μm, 3 μm, 5 μm, 6 μm, 8 μm or 10 μm.

The preparation method of the fluorescent vesicles provided by the present disclosure is simple and easily available in raw materials, and simple in preparation process, in which the fluorescent vesicles can be obtained only by one-step reaction. And also it is mild in reaction conditions, thus the energy consumption is reduced, and no additional fluorescent agent is added during the preparation process, which is pollution-free, green and environmentally friendly. The fluorescent vesicles prepared therefrom can emit different fluorescences such as blue, green and red, and have stable fluorescence performance. The fluorescent vesicles can be used as a bioimaging material or a drug carrier and have a good application prospect.

In the present disclosure, when the fluorescent vesicles are to be prepared, it is preferred to use an aliphatic acid. The illumination reaction causes the aliphatic acid to undergo aliphatic acid polymerization-self-assembly reaction to directly produce nano-scale fluorescent vesicles.

Preferably, the aliphatic acid comprises any one selected from the group consisting of a short-chain aliphatic acid, a medium-chain aliphatic acid, a long-chain aliphatic acid, and a combination of at least two selected therefrom.

Preferably, the short-chain aliphatic acid comprises any one selected from the group consisting of isobutyric acid, butyric acid, isovaleric acid, n-valeric acid, and a combination of at least two selected therefrom.

Preferably, the medium-chain aliphatic acid comprises any one selected from the group consisting of hexanoic acid, 2-oxooctanoic acid, octanoic acid, nonoic acid, decanoic acid, and a combination of at least two selected therefrom.

Preferably, the long-chain aliphatic acid comprises any one selected from the group consisting of oleic acid, linoleic acid, linolenic acid, palmitic acid, stearic acid, and a combination of at least two selected therefrom.

Preferably, the aliphatic acid is a saturated aliphatic acid and/or an unsaturated aliphatic acid, wherein the saturated aliphatic acid comprises no carbon-carbon double bond, while the unsaturated aliphatic acid contains at least one carbon-carbon double bond.

In the present disclosure, the number of carbon atoms in the short-chain aliphatic acid is 4-8, the number of carbon atoms in the medium-chain aliphatic acid is 8-12, and the number of carbon atoms in the long-chain aliphatic acid is 12 or more. Wherein the aliphatic acid may be an organic acid such as caproic acid, nonoic acid, oleic acid or linoleic acid, and the saturated aliphatic acid, comprising no carbon-carbon double bond, may be, for example, nonoic acid, while the unsaturated aliphatic acid, comprising at least one carbon-carbon double bond, may be, for example, linoleic acid. Preferably, the solvent includes a primary solvent and a supplementary solvent.

In the process of preparing the vesicles, the solvent is preferably divided into a primary solvent and a supplementary solvent. The primary solvent comprises water; and the supplementary solvent comprises any one selected from the group consisting of methanol, ethanol, propylene glycol, glycerol, ethylene glycol, butanol, acetonitrile, ethyl acetate, and a combination of at least two selected therefrom.

In the solvent, preferably, the concentration of the aliphatic acid is 2 mM-1 M, and may be, for example, 2 mM, 20 mM, 100 mM, 200 M, 500 M, 800 M or 1 M, preferably 20-200 mM.

Preferably, the volume fraction of the supplementary solvent in the solvent is 0-90% (may be, for example, 0%, 20%, 40%, 50%, 70%, 80% or 90%), and the volume fraction of the primary solvent in the solvent is 10-100% (may be, for example, 10%, 30%, 50%, 60%, 80% or 100%).

Preferably, the volume fraction of the supplementary solvent in the solvent is 0-50%; and the volume fraction of the primary solvent in the solvent is 50-100%.

In the present disclosure, the solvent for the reaction may not be all the supplementary solvent, as no fluorescent vesicle will be prepared when the content of the supplementary solvent is too high.

Preferably, in the process of preparing vesicles, a step of adding a buffer salt is further included during the mixing of the aliphatic acid with the solvent.

Preferably, in the process of preparing vesicles, the buffer salt comprises any one selected from the group consisting of a phosphate, a carbonate, an acetate, a formate, and a combination of at least two selected therefrom.

Preferably, in the process of preparing vesicles, the buffer salt has a concentration of 0.01 mM-0.5 M, and may be, for example, 0.01 mM, 0.1 mM, 0.5 mM, 0.1 M, 0.2 M, 0.3 M, 0.4 M or 0.5 M, preferably 0.1-0.5 mM.

Preferably, in the process of preparing vesicles, the solution of aliphatic acid has a pH value of 1-8, and may be, for example, 1, 2, 3, 5, 6 or 8, preferably a pH value of 3-6.

In the present disclosure, the buffer salt may not be added during the reaction.

In the process of preparing vesicles, the light wavelength for the illumination treatment is 100-1200 nm, and may be, for example, 100 nm, 200 nm, 400 nm, 500 nm, 700 nm or 900 nm, preferably 200-900 nm.

In the process of preparing vesicles, the time for the illumination treatment is 0.5-48 h, and may be, for example, 0.5 h, 4 h, 5 h, 10 h, 20 h, 30 h, 40 h or 48 h, preferably 4-12 h.

In the process of preparing vesicles, the illumination treatment further comprises adding a photosensitizer to the mixed solution.

In the present disclosure, the photosensitizer is a type of photosensitizer commonly used by those skilled in the art.

In the process of preparing vesicles, the illumination treatment is carried out under stirring at a stirring rate of 10-300 r/min, and may be, for example, 10 r/min, 50 r/min, 80 r/min, 100 r/min, 150 r/min, 200 r/min or 300 r/min.

In the present disclosure, the illumination treatment can also be carried out without stirring.

The present disclosure provides a use of the fluorescent vesicles described above as a bioimaging material or a drug carrier. The fluorescent vesicles have a good application prospect.

Preferably, the fluorescent vesicles are subjected to a treatment to obtain FCNs.

Preferably, FCNs have a diameter of 1 nm-100 nm, and may be, for example, 1 nm, 5 nm, 10 nm, 20 nm, 30 nm, 40 nm, 50 nm, 60 nm, 70 nm, 80 nm, 90 nm or 100 nm and the like.

Preferably, the means of the treatment comprises: performing any one or at least two means selected from the group consisting of standing, centrifuging, dialyzing, adding a salt, extracting and chromatographic separation on the fluorescent vesicles, and destroying the vesicles to obtain FCNs.

Preferably, the amphiphilic molecules are subjected to a heat treatment to obtain fluorescent micelles.

The preparation method of fluorescent micelles provided by the present disclosure is a green method that is simple, easy to operate and convenient to control. The amphiphilic molecules are directly subjected to in-situ carbonization and self-assembly to form fluorescent micelles through a simple heat treatment. And the in-situ composite of the FCNs with the micelles has a recombination rate of 100%. While in the commonly used self-assembly method, including encapsulating a dye and using fluorescent molecules to modify amphiphilic molecules, the modification rate of the dye and the fluorescent molecules to the amphiphilic molecules is far less than 100%, and the effect turns out to be poor. Accordingly, the preparation method of the present disclosure is more efficient in in-situ self-assembly.

The preparation process of the present disclosure is simpler and need no addition of any other reagents, without the introduction of contaminants and complicated post-treatment, which is a brand-new green preparation method. The fluorescent micelles prepared therefrom are self-fluorescent due to the FCNs formed by themselves without additional addition of fluorescent molecules.

In the present disclosure, illumination with a suitable wavelength will affect the morphology, fluorescence yield and fluorescence lifetime of the micelles. As compared to fluorescent micelles under illumination at a wavelength of 20 nm-200 nm, the fluorescent micelles under dark conditions or illumination of normal sunlight have an increased oxygen content, a length increased from about 150 nm to about 220 nm, a width decreased from about 50 nm to about 20 nm, a fluorescence yield decreased from 19.4% to 18.5%, and a fluorescence lifetime decreased from 5.23 ns to 5.04 ns. Wherein the length and width of the fluorescent micelles are observed by transmission electron microscopy, the fluorescence yield is measured by a UV spectrophotometer and a fluorescence spectrometer, and the fluorescence lifetime is measured by a time-resolved fluorescence spectrometer.

Preferably, in the process of preparing micelles, the amphiphilic molecules are present in form of an aqueous solution.

In the present disclosure, the amphiphilic molecules and water are appropriately stirred and uniformly dispersed in water to form an aqueous solution of amphiphilic molecules.

In the present disclosure, during the preparation of the micelles, the use of a single-chain surfactant or a two-tailed cationic surfactant can impart higher stability to the prepared fluorescent micelles. Most preferably, nonoic acid, 2-oxooctanoic acid, dioctadecyl dimethyl ammonium chloride or linoleic acid can make the stability of fluorescent micelles the highest, while other amphiphilic molecules can also be used to prepare fluorescent micelles, which, however, have poor stability and may depolymerize.

Preferably, in the process of preparing micelles, the concentration of the amphiphilic molecules in the aqueous solution is 5 mM-1000 mM, and may be, for example, 5 mM, 10 mM, 100 mM, 200 mM, 400 mM, 500 mM, 800 mM or 1000 mM, preferably 10 mM-240 mM.

In the present disclosure, if the concentration of the amphiphilic molecules is too high, the binding efficiency of the FCNs with the micelles in the fluorescent micelles is lowered; and if the concentration of the amphiphilic molecules is too low, the preparation time will increase.

Preferably, the micelles are prepared in a stirring state. The rotation rate for the stirring is 10 rpm-1000 rpm, and may be, for example, 10 rpm, 100 rpm, 500 rpm, 800 rpm or 1000 rpm, preferably 100 rpm-400 rpm.

Preferably, the time for the stirring is 1 min-60 min, and may be, for example, 1 min, 10 min, 30 min, 50 min or 60 min, preferably 1 min-5 min.

Preferably, in the process of preparing micelles, the means of the heat treatment comprises any one selected from the group consisting of rotary evaporation, vacuum distillation and atmospheric distillation, preferably rotary evaporation.

In the present disclosure, in-situ carbonization and self-assembly are promoted by the reduction of the moisture in the reaction system during the heat treatment, whereby the fluorescent micelles can be obtained.

Preferably, in the process of preparing micelles, the time for the heat treatment is 0.1-48 h, and may be, for example, 0.1 h, 1 h, 10 h, 15 h, 20 h, 25 h, 30 h, 35 h, 40 h or 48 h, preferably 1 h-8 h.

Preferably, in the process of preparing micelles, the temperature for the heat treatment is 30° C.-120° C., and may be, for example, 30° C., 40° C., 50° C., 60° C., 80° C., 100° C. or 120° C., preferably 30° C.-80° C.

The preparation method provided by the present disclosure can realize that the fluorescent micelles are controllable in a wider range.

The fluorescent micelles provided by the present disclosure, in which the FCNs are evenly inserted into the micelles, have a worm-like shape, and have a FCNs loading rate of 100%, a high carbon content. The fluorescent micelles show excellent stability so that the fluorescent micelles can still exist stably and can successfully enter cell nucleus after standing for at most 9-10 months.

The fluorescent micelles provided by the present disclosure also has excellent luminescent performance, and the fluorescence quantum yield thereof is about 20%, while it is only 5.2% in the existing methods. And the fluorescent micelles also have a longer fluorescence lifetime reaching 5.23 ns, which is higher than the fluorescence lifetime of some FCNs in the existing technologies. In addition, compared to metal quantum dots, which have toxic defects when used for cell imaging, the fluorescent micelles of the present disclosure show low cytotoxicity.

Preferably, the fluorescent micelles are subjected to a treatment to obtain FCNs.

Preferably, the means of the treatment comprises: performing any one or at least two means selected from the group consisting of standing, centrifuging, dialyzing, adding a salt, extracting and chromatographic separation on the fluorescent micelles, and destroying the micelles to obtain FCNs.

In the present disclosure, the time for the standing is generally 2-100 days; the rotation rate for the centrifugation may be 1-10000 rpm; the salt may be any one selected from the group consisting of sodium chloride, potassium chloride, magnesium chloride, and a combination of at least two selected therefrom; the organic solvent that can be used for the extraction includes any one selected from the group consisting of n-hexane, ethyl acetate, methanol, ethanol, and a combination of at least two selected therefrom.

The preparation method of FCNs provided by the present disclosure is simple, wherein the illumination is used to induce the polymerization-self-assembly of the amphiphilic molecules to form a vesicle microreactor, and the amphiphilic molecules or other organic molecules can be used as a precursor of the carbon material. The carbonization process is accelerated by illumination inside the vesicle microreactor, and only one step of illumination reaction is needed to complete the preparation in a mild condition without the need of heating and pressing. This method reduces the energy consumption and requires no addition of prepared nanoparticles. All the preparation processes are non-polluting, green and environmentally friendly. Fluorescent carbon nanomaterials obtained therefrom possess excellent up-conversion and down-conversion fluorescence performance, have small particle size, can emit multiple fluorescence colors, show dual wavelengths at single excitation wavelength, and show high controllability.

Preferably, the amphiphilic molecules are subjected to an illumination treatment and then a heat treatment to obtain a mixture of hydrophilic fluorescent vesicles and hydrophobic fluorescent micelles.

In the present disclosure, the amphiphilic molecules act directly as the precursors for FCNs and vesicles/micelles. The amphiphilic molecules are illuminated to form a dimer of the amphiphilic molecules, and the dimer of the amphiphilic molecules self-assemble to form vesicles, and the vesicles are compounded with the late-formed FCNs and self-assemble to obtain hydrophilic fluorescent vesicles. FCNs and micelles are formed at the same time, which two are compounded and self-assembled to obtain hydrophobic fluorescent micelles.

Preferably, in the process of preparing the mixture of hydrophilic fluorescent vesicles and hydrophobic fluorescent micelles, the concentration of the amphiphilic molecules in the solvent system is 0.01 mM-1000 mM, and may be, for example, 0.01 mM, 1 mM, 10 mM, 100 mM, 200 mM, 400 mM, 500 mM, 700 mM, 800 mM, 900 mM or 1000 mM, preferably 10 mM-120 mM.

Preferably, in the process of preparing the mixture of hydrophilic fluorescent vesicles and hydrophobic fluorescent micelles, the wavelength for the illumination treatment is 100 nm-2500 nm, and may be, for example, 100 nm, 200 nm, 300 nm, 400 nm, 500 nm, 600 nm, 700 nm, 800 nm, 900 nm, 1000 nm, 2000 nm or 2500 nm, preferably 300 nm-800 nm.

Preferably, in the process of preparing the mixture of hydrophilic fluorescent vesicles and hydrophobic fluorescent micelles, the time for the illumination treatment is 0.1 h-100 h, and may be, for example, 0.1 h, 1 h, 10 h, 15 h, 20 h, 25 h, 30 h, 35 h, 40 h or 48 h, preferably 2 h-12 h.

Preferably, in the process of preparing the mixture of hydrophilic fluorescent vesicles and hydrophobic fluorescent micelles, the means of the heat treatment comprises any one selected from the group consisting of rotary evaporation, vacuum distillation and atmospheric distillation, preferably rotary evaporation.

In the process of preparing the mixture of hydrophilic fluorescent vesicles and hydrophobic fluorescent micelles, the time for the heat treatment is 0.1 h-48 h, and may be, for example, 0.1 h, 1 h, 10 h, 15 h, 20 h, 25 h, 30 h, 35 h, 40 h or 48 h, preferably 1 h-8 h.

In the process of preparing the mixture of hydrophilic fluorescent vesicles and hydrophobic fluorescent micelles, the temperature for the heat treatment is 30° C.-300° C., and may be, for example, 30° C., 40° C., 50° C., 60° C., 80° C., 100° C. or 120° C., preferably 30° C.-80° C.

Preferably, water is added to the mixture of hydrophilic fluorescent vesicles and hydrophobic fluorescent micelles. Thereafter, oscillation and standing are performed for separation. Hydrophilic fluorescent vesicles are obtained from the aqueous phase, while hydrophobic fluorescent micelles are separated from the oil phase.

In the present disclosure, when the amphiphilic molecules in a solvent system is added to water, the resulting hydrophilic fluorescent vesicles are separated into an aqueous phase, and thus hydrophilic fluorescent vesicles are obtained by separation. The remaining product is separated to obtain fluorescent micelles, meaning that the fluorescent micelles in the mixture are hydrophobic and therefore present in the remaining oil phase, so that the organic phase can be removed to obtain the fluorescent micelles. That is, the present disclosure achieves the control of the hydrophilic fluorescent vesicles and hydrophobic fluorescent micelles.

Compared to the existing methods of self-assembly by using amphiphilic molecules to encapsulate a dye or using fluorescent molecules to modify amphiphilic molecules, the present method is mild in conditions, simple, safe and green in preparation process. Further, the present method requires no additional addition of chemical solvents and substances that are difficult to separate or toxic, with no introduction or generation of contaminants. And the present method has no complicated post-treatment steps. And the oxygen-containing functional groups in vesicles and micelles are prone to later functionalization, therefore the method is a controllable green method.

Preferably, the volume ratio of the mixture to the water is 0.2:1-10:1, and may be, for example, 0.2:1, 1:1, 2:1, 3:1, 4:1, 5:1, 6:1, 7:1, 8:1, 9:1 or 10:1, preferably 1:1-3:1.

Preferably, in the process of preparing the mixture of hydrophilic fluorescent vesicles and hydrophobic fluorescent micelles, the rate for the oscillation is 10 r/min-1000 r/min, and may be, for example, 10 r/min, 50 r/min, 100 r/min, 150 r/min, 300 r/min, 400 r/min, 500 r/Min, 600 r/min, 700 r/min, 900 r/min or 1000 r/min, preferably 50 r/min-100 r/min.

Preferably, in the process of preparing the mixture of hydrophilic fluorescent vesicles and hydrophobic fluorescent micelles, the time for the standing is 0.5 h-100 h, and may be, for example, 0.5 h, 2 h, 4 h, 8 h, 12 h, 16 h, 22 h, 26 h, 30 h, 35 h or 48 h, preferably 8 h-12 h.

The hydrophilic fluorescent vesicles obtained from the mixture have a diameter of 1 nm-1000 nm, and may be, for example, 1 nm, 10 nm, 100 nm, 150 nm, 200 nm, 300 nm, 500 nm, 800 nm, 900 nm or 1000 nm.

The hydrophobic fluorescent micelles obtained from the mixture have a length of 1 nm-2000 nm; and may be, for example, 1 nm, 100 nm, 500 nm, 800 nm, 1000 nm, 1500 nm, 1800 nm or 2000 nm.

The hydrophobic fluorescent micelles obtained from the mixture have a width of 1 nm-500 nm, and may be, for example, 1 nm, 100 nm, 200 nm, 300 nm, 400 nm or 500 nm.

The hydrophilic fluorescent vesicles and hydrophobic fluorescent micelles obtained by the steps of illumination and heat treatment differ in size from the fluorescent vesicles obtained only by illumination and the micelles obtained only by heat treatment.

The control method provided by the present disclosure can realize that the hydrophilic fluorescent vesicles and the hydrophobic fluorescent micelles are controllable within the above wide ranges.

In the second aspect, the present disclosure provides a use of the fluorescent vesicles, the fluorescent micelles, the FCNs and the mixture of hydrophilic fluorescent vesicles and hydrophobic fluorescent micelles in the preparation of photoelectric materials, bioimaging agents, diagnostic sensors, drug delivery materials, water treatment adsorption degradation materials or catalytic materials.

As compared to the existing technologies, the present disclosure has the following beneficial effects:

The preparation method of fluorescent nanomaterials provided by the present disclosure is simple in process, simple and easily available in raw materials and requires neither additional addition of a strong acid, a strong alkali, a passivating agent and the like, nor high temperature and high pressure in the preparation process. Therefore, the preparation method is environmentally friendly and pollution-free.

The fluorescent vesicles prepared by the preparation method of the present disclosure can emit different fluorescences of blue, cyan, green and red, and have stable fluorescence performance, which can be used as a bioimaging material or a drug carrier, and have a good application prospect.

As for the fluorescent micelles prepared by the preparation method of the present disclosure, the amphiphilic molecules are directly subjected to in-situ carbonization and self-assembly to form fluorescent micelles through a simple heat treatment. And the in-situ composite of the FCNs with the micelles has a recombination rate that can reach 100%. While in the commonly used self-assembly methods, including encapsulating fluorescent dyes and quantum dots or using fluorescent molecules to modify amphiphilic molecules, the modification rate of the fluorescent dyes, quantum dots and the fluorescent molecules to the amphiphilic molecules is far less than 100%. Therefore, the effect of the commonly used methods turns out to be poor and the in-situ self-assembly efficiency is lower.

All the hydrophilic fluorescent vesicles and the hydrophobic fluorescent micelles provided by the present disclosure have excellent fluorescence characteristics, high fluorescence stability (allowing stable present for a maximum of 9-10 months), long fluorescence lifetime (reaching 5.23 ns which is unattainable for most other single FCNs), high fluorescence quantum yield (a yield around 20%), and low cytotoxicity allowing successful entering cell nucleus for imaging. These characteristics armed them with high application value and good application prospect.

The preparation method of FCNs provided by the present disclosure is simple, wherein the illumination is used to induce the polymerization-self-assembly of the amphiphilic molecules to form a vesicle microreactor, and the amphiphilic molecules or other organic molecules act as a precursor of the carbon material. The carbonization process is accelerated by illumination inside the vesicle microreactor, and only one step of illumination reaction is needed to complete the preparation in a mild condition without need of strong acid, strong alkali, and heating and pressurizing, which reduces energy consumption. The fluorescent nanomaterials obtained therefrom simultaneously possess excellent absorbility in the visible region, up-conversion and down-conversion fluorescence performances, small particle size, multiple fluorescence colors and dual wavelengths excited at single excitation wavelength, and high controllability.

DETAILED DESCRIPTION

The technical solutions of the present disclosure are further illustrated by the specific embodiments below. Those skilled in the art shall understand that the examples are set forth to assist in understanding the present disclosure and should not be regarded as specific limitations to the present disclosure.

Example 1

In this example, fluorescent vesicles were prepared by the following method:

Nonoic acid having a concentration of 60 mM was dissolved in water, sonicated at 100 W for 10 min. And after the solution was uniformly mixed, a reaction was carried out at a stirring rate of 200 r/min under illumination with a wavelength of 254-1100 nm. After 12 hours of reaction, fluorescent vesicles were obtained.

Figure 1:
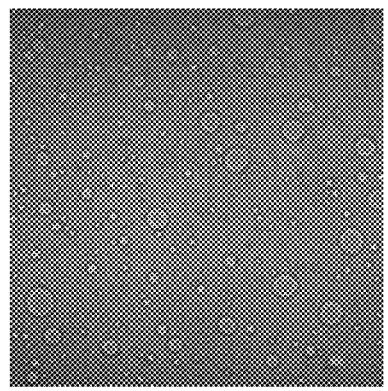
FIG. 1 is a transmission electron microscope (TEM) image of the fluorescent vesicles prepared in Example 1 of the present disclosure.

The prepared vesicles were observed with TEM, as shown in FIG. 1. It can be seen that the vesicles have a regular shape and are stable and uniform.

Example 2

In this example, fluorescent vesicles were prepared by the following method:

2-oxooctanoic acid having a concentration of 200 mM was dissolved in a mixed solvent of water and ethanol, wherein the mass fraction of ethanol was 50%. Then a phosphate buffer (PBS) was added to adjust the pH of the solution to 8, and a photosensitizer was added. After the solution was uniformly mixed, a reaction was carried out at a stirring rate of 300 r/min under illumination with a wavelength of 700 nm. After 16 hours of reaction, fluorescent vesicles were obtained.

Figure 2:
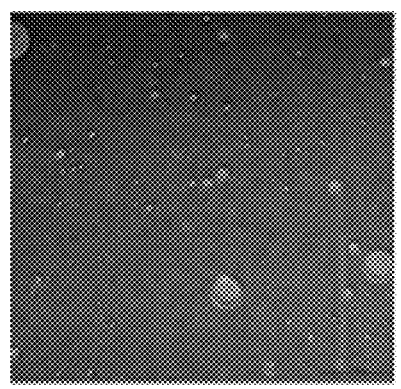
FIG. 2 is a fluorescence micrograph of the fluorescent vesicles prepared in Example 2 of the present disclosure.
Figure 3:
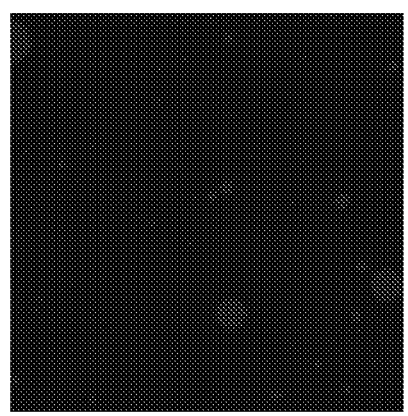
FIG. 3 is a graph showing the fluorescent vesicles prepared in Example 2 of the present disclosure exhibiting blue fluorescence.
Figure 4:
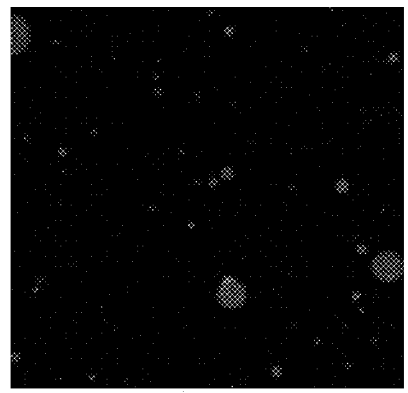
FIG. 4 is a graph showing the fluorescent vesicles prepared in Example 2 of the present disclosure exhibiting green fluorescence.

The prepared vesicles were observed with TEM, as shown in FIG. 2. It can be seen that the vesicles have a regular shape and are stable and uniform. The prepared fluorescent vesicles were observed by fluorescence microscopy, as shown in FIG. 3 and FIG. 4. It can be observed that the fluorescent vesicles in FIG. 3 exhibit blue color, and the fluorescent vesicles in FIG. 4 exhibit green color and the fluorescence performance is stable.

Example 3

In this example, fluorescent vesicles were prepared by the following method:

Nonoic acid having a concentration of 50 mM was dissolved in a mixed solvent of water and acetonitrile, wherein the volume fraction of acetonitrile was 50%. Then a PBS was added to adjust the pH of the solution to 5. After the solution was uniformly mixed, a reaction was carried out at a stirring rate of 300 r/min under illumination with a wavelength of 180 nm. After 48 hours of reaction, fluorescent vesicles were obtained.

Example 4

In this example, fluorescent vesicles were prepared by the following method:

Cetylic acid having a concentration of 1 M was dissolved in a mixed solvent of water and ethylene glycol, wherein the volume fraction of ethylene glycol was 50%. Then a carbonate buffer was added to adjust the pH of the solution to 6. After the solution was uniformly mixed, a reaction was carried out at a stirring rate of 300 r/min under illumination with a wavelength of 200 nm. After 0.5 hours of reaction, fluorescent vesicles were obtained.

Example 5

In this example, fluorescent vesicles were prepared by the following method:

Linoleic acid having a concentration of 2 mM was dissolved in water, then a formate buffer was added to adjust the pH of the solution to 1. After the solution was uniformly mixed, a reaction was carried out at a stirring rate of 300 r/min under illumination with a wavelength of 313 nm. After 48 hours of reaction, fluorescent vesicles were obtained.

Example 6

In this example, fluorescent vesicles were prepared by the following method:

Oleic acid having a concentration of 20 mM was dissolved in water to obtain a solution with a pH of 7. After the solution was uniformly mixed, a reaction was carried out under illumination with a wavelength of 254 nm. After 10 hours of reaction, fluorescent vesicles were obtained.

Comparison Example 1

Saturated aliphatic acid having a concentration of 60 mM was dissolved in water to obtain a solution with a pH of 7.

After the solution was uniformly mixed, a reaction was carried out at a temperature of 50° C. After 12 hours of reaction, fluorescent vesicles were obtained.

Comparison Example 2

Saturated aliphatic acid having a concentration of 20 mM was dissolved in 100% methanol to obtain a solution with a pH of 7. After the solution was uniformly mixed, a reaction was carried out at a temperature of 50° C. After 12 hours of reaction, fluorescent vesicles were obtained.

It can be seen from the comparisons between Examples 1-6 and Comparative Examples 1-2 that if the reaction is not carried out under illumination, fluorescent vesicles cannot be prepared, which proves that illumination is a prerequisite for the formation of the fluorescent vesicles. Meanwhile, if the supplementary solvent content (e.g., methanol content) of the reaction is too high, since it destroys the force between the amphiphilic molecules, the fluorescent vesicles cannot be formed even under illumination.

The preparation method of the fluorescent vesicles provided by the present disclosure is simple, in which the fluorescent vesicles can be obtained only by one step reaction, and the reaction conditions are mild, green and environmentally friendly.

Example 7

In this example, FCNs were prepared by the following method:

Octanoic acid solution having a concentration of 100 mM and citric acid having a concentration of 0.5 M were dissolved in water, and a PBS having a concentration of 0.5 mM was added to adjust the pH of the solution to 7. The solution was uniformly mixed and then subjected to a reaction under illumination with a wavelength of 254-1100 nm and stirring at a rate of 200 r/min. After 12 h of reaction, vesicle-encapsulated FCNs were obtained, then sodium chloride was added, and the vesicles were destroyed to obtain FCNs by separation.

Figure 5A:
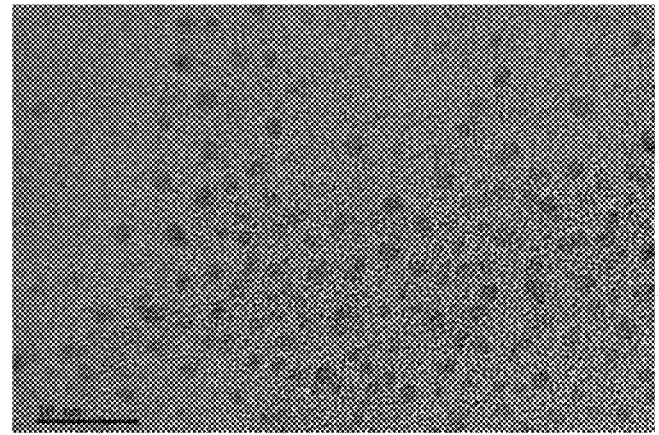
FIG. 5A is a TEM image of the morphology of the FCNs (blue) prepared in Example 7 of the present disclosure.
Figure 5B:
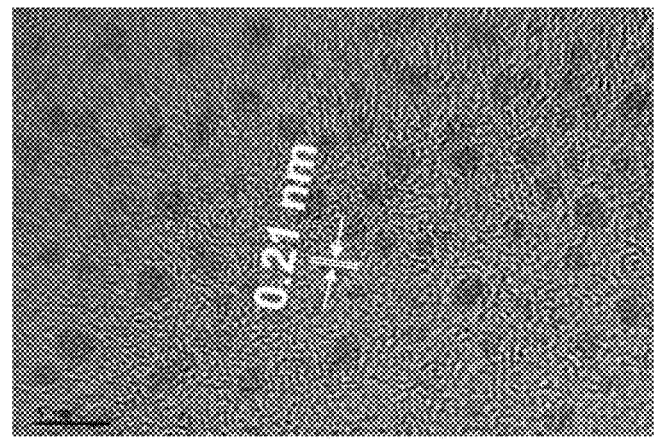
FIG. 5B is a TEM image of the particle size of the FCNs (blue) prepared in Example 7 of the present disclosure.
Figure 5C:
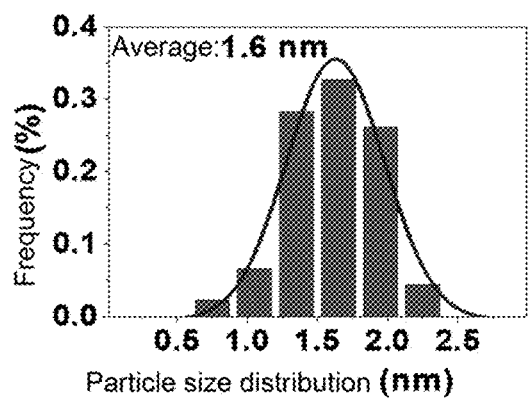
FIG. 5C is a particle size distribution diagram of the FCNs (blue) prepared in Example 7 of the present disclosure.

The prepared FCNs were observed by TEM as shown in FIG. 5A, and the particle size diagram was obtained as shown in FIG. 5B, and the particle size distribution diagram is shown in FIG. 5C.

As can be seen from FIG. 5A, the FCNs emit blue fluorescence. As can be seen from FIG. 5B, the FCNs have a particle size of 0.21 nm, and it can be concluded from the particle size distribution diagram in FIG. 5C that the average particle size is 1.6 nm.

Example 8

In this example, FCNs were prepared by the following method:

2-oxooctanoic acid having a concentration of 200 mM and n-hexane having a concentration of 1 M were dissolved in a mixed solvent of water and ethanol, wherein the volume fraction of ethanol is 50%. And an acetate buffer having a concentration of 0.2 mM was added to adjust the pH of the solution to 5, and a photosensitizer was added. The solution was uniformly mixed and then subjected to a reaction under illumination with a wavelength of 800 nm and stirring at a rate of 300 r/min. After 8 h of reaction, vesicle-encapsulated FCNs were obtained, and FCNs were obtained by destroying the vesicles after standing for 5 days.

Figure 6A:
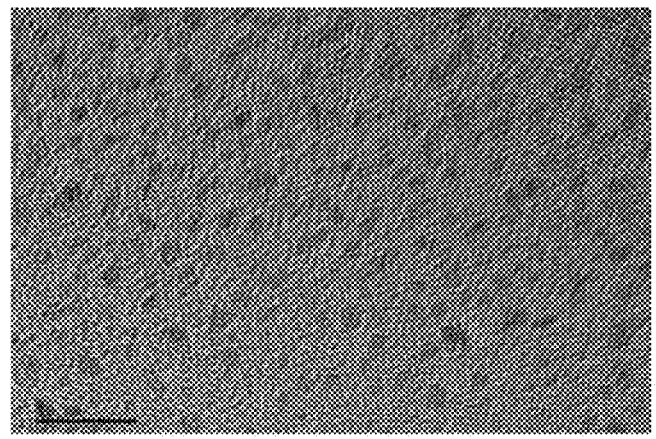
FIG. 6A is a TEM image of the morphology of the FCNs (cyan) prepared in Example 8 of the present disclosure.
Figure 6B:
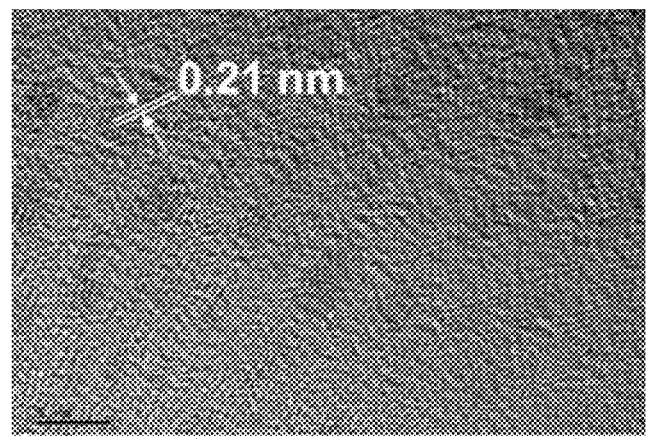
FIG. 6B is a TEM image of the particle size of the FCNs (cyan) prepared in Example 8 of the present disclosure.
Figure 6C:
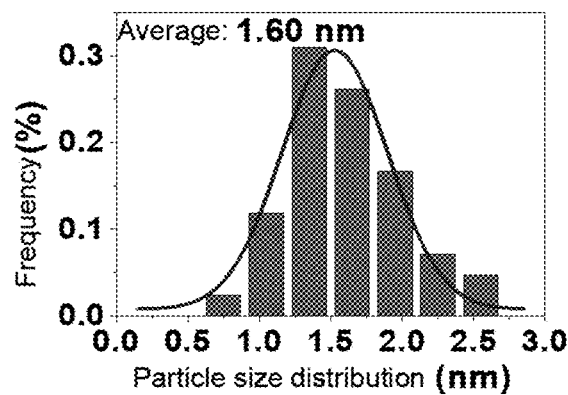
FIG. 6C is a particle size distribution diagram of the FCNs (cyan) prepared in Example 8 of the present disclosure.

The prepared FCNs were observed by TEM as shown in FIG. 6A, and the particle size diagram was obtained as shown in FIG. 6B, and the particle size distribution diagram is shown in FIG. 6C.

As can be seen from FIG. 6A, the FCNs emit cyan fluorescence. As can be seen from FIG. 6B, the FCNs have a particle size of 0.21 nm, and it can be concluded from the particle size distribution diagram in FIG. 6C that the average particle size is 1.6 nm.

Example 9

In this example, FCNs were prepared by the following method:

Octadecanoic acid having a concentration of 1 M and oleic acid having a concentration of 5 M were dissolved in a mixed solvent of water and acetonitrile, wherein the volume fraction of acetonitrile is 90%. And a formate buffer having a concentration of 0.5 M was added to adjust the pH of the solution to 1, and a photosensitizer was added. The solution was uniformly mixed and then subjected to a reaction under illumination with a wavelength of 600 nm and stirring at a rate of 10 r/min. After 48 h of reaction, vesicle-encapsulated FCNs were obtained, then the vesicles were destroyed to obtain FCNs by centrifugation.

Figure 7A:
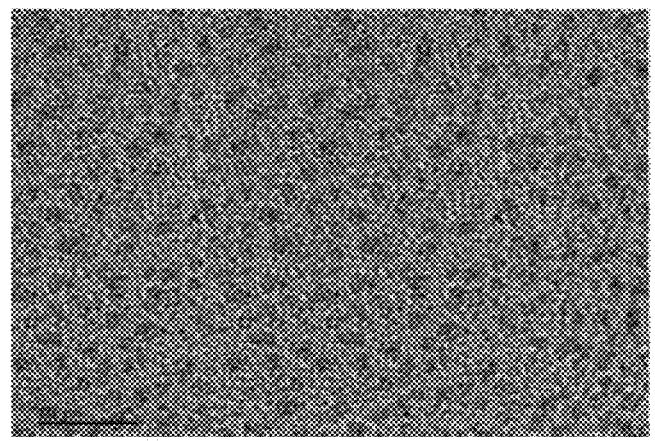
FIG. 7A is a TEM image of the morphology of the FCNs (green) prepared in Example 9 of the present disclosure.
Figure 7B:
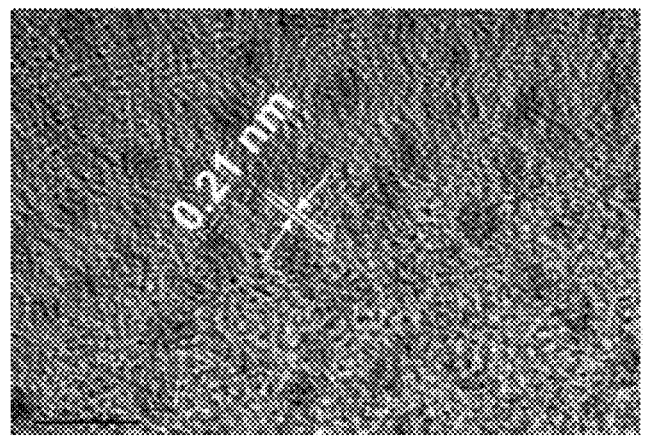
FIG. 7B is a TEM image of the particle size of the FCNs (green) prepared in Example 9 of the present disclosure.
Figure 7C:
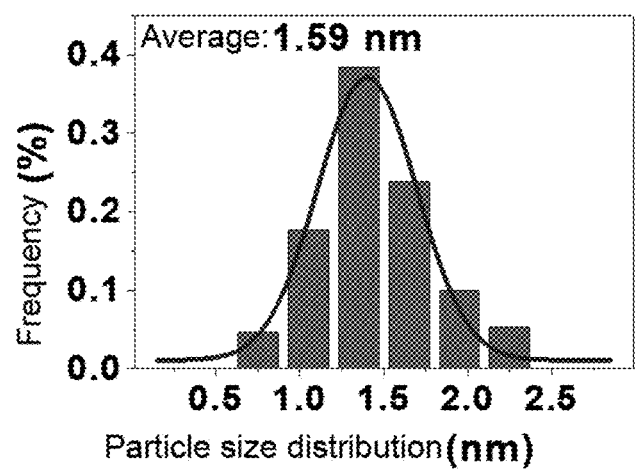
FIG. 7C is a particle size distribution diagram of the FCNs (green) prepared in Example 9 of the present disclosure.

The prepared FCNs were observed by TEM as shown in FIG. 7A, and the particle size diagram was obtained as shown in FIG. 7B, and the particle size distribution diagram is shown in FIG. 7C.

As can be seen from FIG. 7A, the FCNs emit green fluorescence. As can be seen from FIG. 7B, the FCNs have a particle size of 0.21 nm, and it can be concluded from the particle size distribution diagram in FIG. 7C that the average particle size is 1.59 nm.

Example 10

In this example, nitrogen-doped FCNs were prepared by the following method:

A solution of nonyl amine having a concentration of 60 mM was dispersed in water, and ultrasonically dispersed for 10 min, then stirred for 10 min. After the solution was mixed evenly, it was subjected to a reaction under illumination with a wavelength of 254 nm-1100 nm and stirring at a rate of 200 r/min. After 12 h of reaction, vesicle-encapsulated FCNs were obtained, and purified FCNs were obtained through extraction with n-hexane and chromatographic column separation.

Figure 8A:
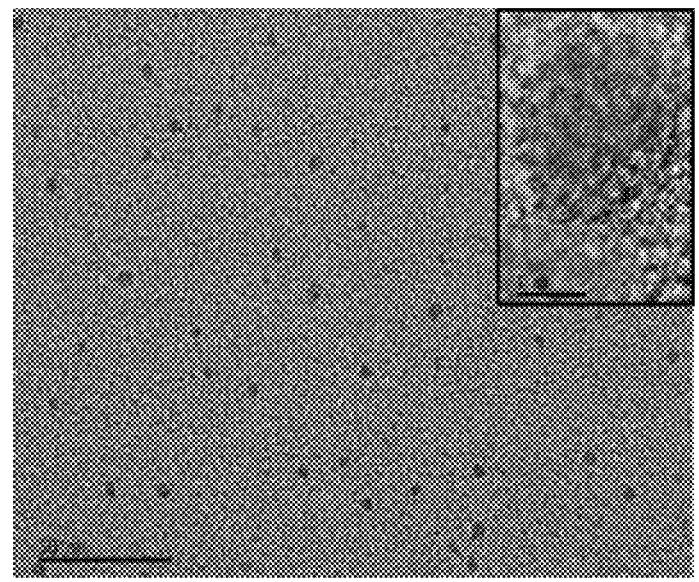
FIG. 8A is a TEM image of the nitrogen-doped FCNs prepared in Example 10 of the present disclosure (scale: 50 nm).
Figure 8B:
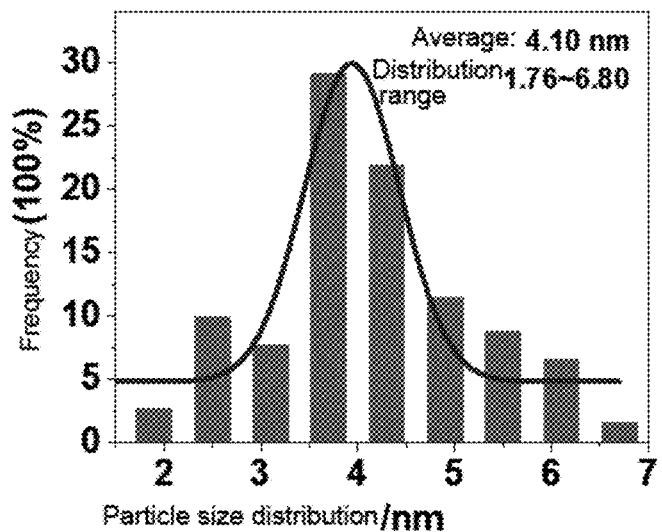
FIG. 8B is a particle size distribution diagram of the nitrogen-doped FCNs prepared in Example 10 of the present disclosure.

The prepared FCNs were observed by TEM as shown in FIG. 8A, and the particle size distribution diagram is shown in FIG. 8B.

As can be seen from FIG. 8A, the FCNs are approximately spherical, in which the illustration in the upper right corner is a magnified view of the particles; and as can be seen from FIG. 8B, their average particle diameter is 4.10 nm.

Example 11

In this example, FCNs were prepared by the following method:

A solution of nonaldehyde having a concentration of 60 mM was dispersed in water, and ultrasonically dispersed for 10 min, then stirred for 10 min. After the solution was mixed evenly, it was subjected to a reaction under illumination with a wavelength of 254 nm-1100 nm and stirring at a rate of 200 r/min. After 12 h of reaction, vesicle-encapsulated FCNs were obtained, and purified FCNs were obtained through extraction with n-hexane and chromatographic column separation.

Figure 9A:
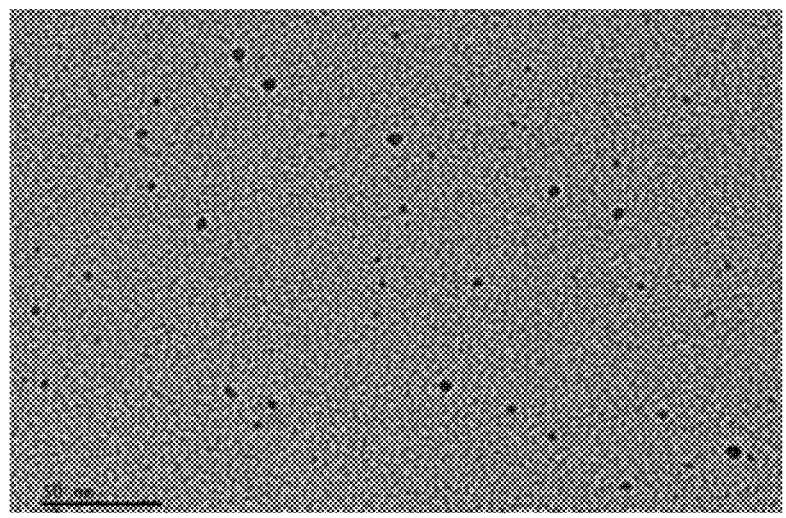
FIG. 9A is a TEM image of the nitrogen-doped FCNs prepared in Example 11 of the present disclosure (scale: 50 nm).
Figure 9B:
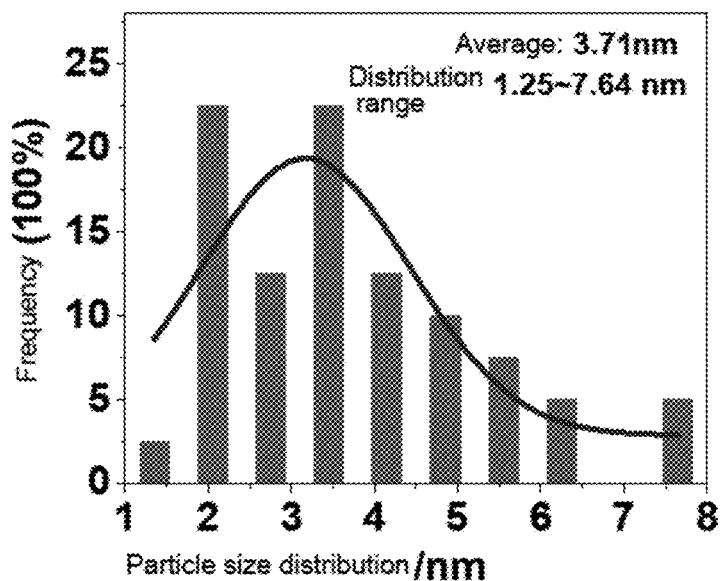
FIG. 9B is a particle size distribution diagram of the nitrogen-doped FCNs prepared in Example 11 of the present disclosure.

The prepared FCNs were observed by TEM as shown in FIG. 9A, and the particle size distribution diagram is shown in FIG. 9B.

As can be seen from FIG. 9A, the FCNs are approximately spherical; and as can be seen from FIG. 9B, their average particle diameter is 3.71 nm.

Comparison Example 3

In this comparison example, inorganic nanocrystalline vesicle-like microspheres were prepared as in Comparison Example 1 of the method disclosed in CN103920433A as a comparison, and the specific method is as follows:

At room temperature, 50 μL of 7-(12-mercapto dodecyloxy)-2H-benzopyran-2-one in toluene at a concentration of 4 mM was added to gold nanoparticles (having a particle size of 3 nm) modified with oleylamine molecules on the surface in toluene, in which the gold nanoparticles had a mass of 1 mg and the toluene solution had a volume of 4 mL. After the mixture was ultrasound treated for 30 min, it was centrifugal washed twice with about 30 mL of ethanol. The ratio of surface mercaptan to oleylamine was 1:3 as determined by XPS. The resulting solid was dispersed in 400 μL of toluene and then homogenized into 3.6 mL of acetone. The mixture was immediately illuminated with ultraviolet light having a wavelength of 300-400 nm in the air for about 30 minutes while condensed water was introduced to maintain the system at room temperature to obtain vesicle-like microspheres of gold nanocrystals.

Comparison Example 4

In the present comparison example, the nanoparticles were prepared by the method disclosed in CN104327851B, and the specific method is as follows:

0.6 g of water-soluble carbon nano-dots, 4 g of anhydrous potassium carbonate (Tianjin Guangfu Fine Chemical Research Institute), 0.4 g of potassium iodide (Tianjin Sailboat Chemical Reagent Technology Co., Ltd.), 60 mL of N, N-dimethyl formamide (Xilong Chemical Co., Ltd.), 2.4 mL of bromobutane (Tianjin Guangfu Fine Chemical Research Institute) were weighed to blend in a 250 mL Erlenmeyer flask and heated to reflux at 180° C. for 12 h. After the reaction is completed, the reacted solution was suction filtered twice with a suction filtration device, and then distilled under reduced pressure at 150° C. until the solvent is completely evaporated. The obtained solid was dissolved in 20 mL of toluene (lipophilic carbon nanodots and amphiphilic carbon nanodots were all dissolved in toluene); and the toluene solution in which carbon nanodots were dissolved was centrifuged at high speed to obtain amphiphilic carbon nanodots.

It can be seen from the comparisons of Examples 7-11 and Comparison Examples 3-4 that the preparation method of FCNs provided by the present disclosure is simple, in which the FCNs can be prepared by only one step of reaction, without additional addition of prepared nanoparticles. It also has mild reaction conditions, which reduces the energy consumption of the reaction. However, the carbon nanomaterials prepared in the comparison examples need complicated reaction steps and high energy consumption, which is unfavorable to application.

Example 12

In this example, a mixture of fluorescent vesicles and fluorescent micelles was prepared by the following method:

(1) nonoic acid and water were mixed at a stirring speed of 100 rpm for 5 min to obtain an aqueous solution of nonoic acid at a concentration of 120 mM, followed by an illumination pretreatment at a wavelength of 254-1100 nm for 5 h, and a reaction was carried out under stirring with a stirring speed of 500 rpm and a stirring time of 5 h. And the emulsion obtained after the illumination was then rotary evaporated at a rotary evaporation temperature of 80° C. for 2 h. Then water was added to conduct oscillation and stationary separation, wherein the ratio (volume ratio) of the added water to the rotary evaporated product was 2:1, the oscillation speed was 100 rpm, the oscillation time was 1 min, and the standing time was 20 h. And FCNs-modified hydrophilic fluorescent vesicles were obtained from the water phase, while FCNs-modified hydrophobic fluorescent micelles were obtained from the oil phase by separation.

Figure 10:
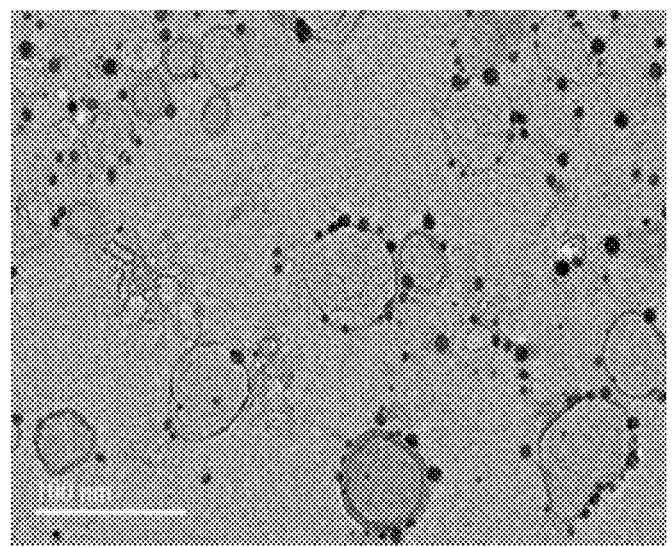
FIG. 10 is a TEM image of the hydrophilic fluorescent vesicles prepared in Example 12 of the present disclosure (scale: 100 nm).
Figure 11:
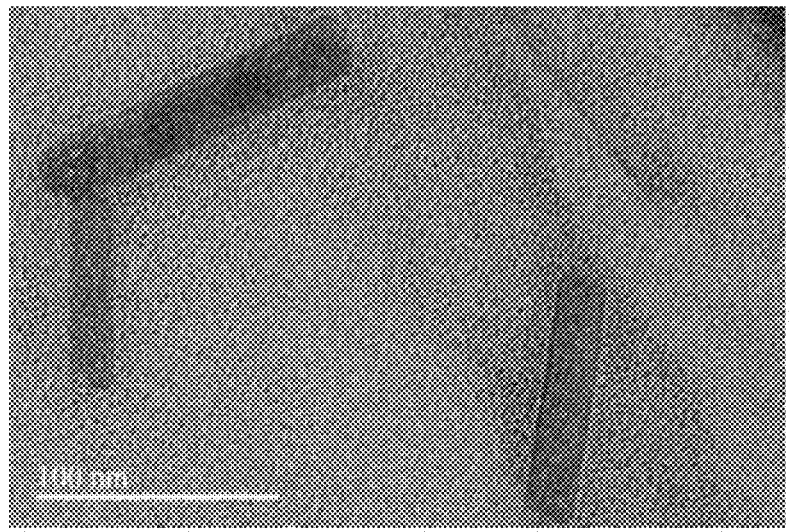
FIG. 11 is a TEM image of the hydrophobic fluorescent micelles prepared in Example 12 of the present disclosure (scale: 100 nm).

The above prepared hydrophilic fluorescent vesicles and hydrophobic fluorescent micelles were observed with TEM, and the specific results obtained are shown in FIG. 10 and FIG. 11. As can be seen from FIG. 10, the obtained hydrophilic fluorescent vesicles are evenly distributed and have a diameter distribution of 20 nm-80 nm, and the hydrophobic fluorescent micelles in FIG. 11 have a length distribution of 100 nm-280 nm and a width distribution of 18 nm-70 nm.

Figure 12:
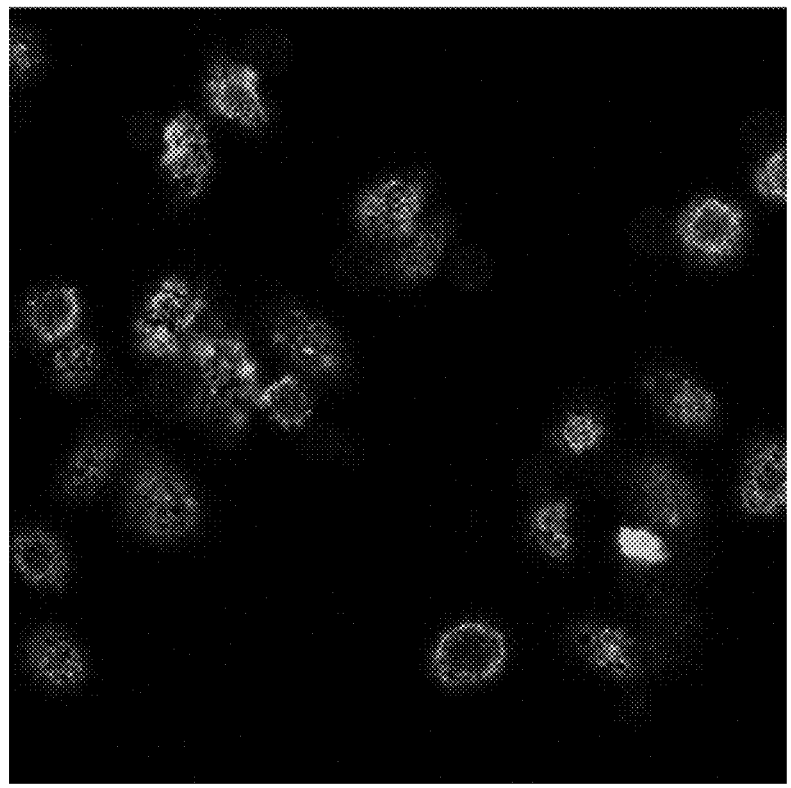
FIG. 12 is a cell imaging diagram of the fluorescent vesicles in Example 12 of the present disclosure.

The above prepared product was subjected to an imaging result test, as shown in FIG. 12, and it was found that a good imaging effect can be produced.

Example 13

In this example, a mixture of fluorescent vesicles and fluorescent micelles was prepared by the following method:

(1) octanoic acid and water were mixed at a stirring speed of 1000 rpm for 1 min to obtain an aqueous solution of octanoic acid at a concentration of 140 mM, followed by an illumination pretreatment at a wavelength of 313 nm for 12 h, and a reaction was carried out under stirring with a stirring speed of 800 rpm and a stirring time of 11 h. After the reaction was finished, no separation was carried out, and vacuum distillation was conducted at a temperature of 100° C. for 3 h. Then water was added to conduct oscillation and stationary separation, wherein the ratio (volume ratio) of the added water to the distilled product was 4:1, the oscillation speed was 200 rpm, the oscillation time was 6 h, and the standing time was 20 h. And hydrophilic fluorescent vesicles were obtained from the water phase, while FCNs-modified hydrophobic fluorescent micelles were obtained from the oil phase by separation.

The obtained hydrophilic fluorescent vesicles have a diameter distribution of 10 nm-300 nm, and the hydrophobic fluorescent micelles have a length distribution of 20 nm-500 nm and a width distribution of 20 nm-200 nm.

Example 14

In this example, a mixture of fluorescent vesicles and fluorescent micelles was prepared by the following method:

(1) 2-oxooctanoic acid and water were mixed at a stirring speed of 100 rpm for 5 min to obtain an aqueous solution of 2-oxooctanoic acid at a concentration of 120 mM, followed by an illumination pretreatment at a wavelength of 300 nm for 5 h, and a reaction was carried out under stirring with a stirring speed of 500 rpm for 5 h. After the reaction was finished, no separation was carried out, and rotary evaporation was conducted at a temperature of 120° C. for 2 h. Then water was added to conduct oscillation and stationary separation, wherein the ratio (volume ratio) of the added water to the rotary evaporated product was 1:1, the oscillation speed was 100 rpm, the oscillation time was 6 h, and the standing time was 20 h. And the hydrophilic fluorescent vesicles were obtained from the water phase, while FCNs-modified hydrophobic fluorescent micelles were obtained from the oil phase by separation.

The obtained hydrophilic fluorescent vesicles have a diameter distribution of 15 nm-200 nm, and the hydrophobic fluorescent micelles have a length distribution of 90 nm-300 nm and a width distribution of 10 nm-150 nm.

Example 15

In this example, a mixture of fluorescent vesicles and fluorescent micelles was prepared by the following method:

(1) sphingomyelin and water were mixed at a stirring speed of 10 rpm for 60 min to obtain an aqueous solution of sphingomyelin at a concentration of 0.001 mM, followed by an illumination pretreatment at a wavelength of 200 nm for 48 h, and a reaction was carried out under stirring with a stirring speed of 20 rpm for 48 h. And the reaction solution obtained after the illumination was then rotary evaporated at a rotary evaporation temperature of 80° C. and a vacuum degree of −0.1 MPa for 48 h. Then water was added to conduct oscillation and stationary separation, wherein the ratio (volume ratio) of the added water to the rotary evaporated product was 0.2:1, the oscillation speed was 10 rpm, the oscillation time was 6 h, and the standing time was 0.5 h. And the hydrophilic fluorescent vesicles were obtained from the water phase, while FCNs-modified hydrophobic fluorescent micelles were obtained from the oil phase by separation.

The obtained hydrophilic fluorescent vesicles have a diameter distribution of 5 nm-1000 nm, and the hydrophobic fluorescent micelles have a length distribution of 2 nm-1000 nm and a width distribution of 2 nm-500 nm.

Example 16

In this example, a mixture of fluorescent vesicles and fluorescent micelles was prepared by the following method:

(1) polyacrylamide and water were mixed at a stirring speed of 10 rpm for 60 min to obtain an aqueous solution of polyacrylamide at a concentration of 6000 mM, followed by an illumination pretreatment at a wavelength of 313 nm for 0.1 h, and a reaction was carried out under stirring with a stirring speed of 1000 rpm and a stirring time of 0.1 h. After the reaction was finished, no separation was carried out, and rotary evaporation was conducted at a temperature of 120° C. for 0.1 h. Then water was added to conduct oscillation and stationary separation, wherein the ratio (volume ratio) of the added water to the rotary evaporated product was 10:1, the oscillation speed was 1000 rpm, the oscillation time was 6 h, and the standing time was 48 h. And the hydrophilic fluorescent vesicles were obtained from the water phase, while FCNs-modified hydrophobic fluorescent micelles were obtained from the oil phase by separation.

The obtained hydrophilic fluorescent vesicles have a diameter distribution of 10 nm-1000 nm, and the hydrophobic fluorescent micelles have a length distribution of 2 nm-200 nm and a width distribution of 1 nm-1000 nm.

Example 17

In this example, fluorescent micelles were prepared by the following method:

Nonoic acid and water were mixed at a stirring speed of 100 rpm for 5 min to obtain an aqueous solution of nonoic acid at a concentration of 60 mM, followed by rotary evaporation at a temperature of 50° C. for 2 h. After the reaction was finished, fluorescent micelles were obtained without any separation, wherein the binding efficiency of FCNs with micelles is 100%.

Figure 13:
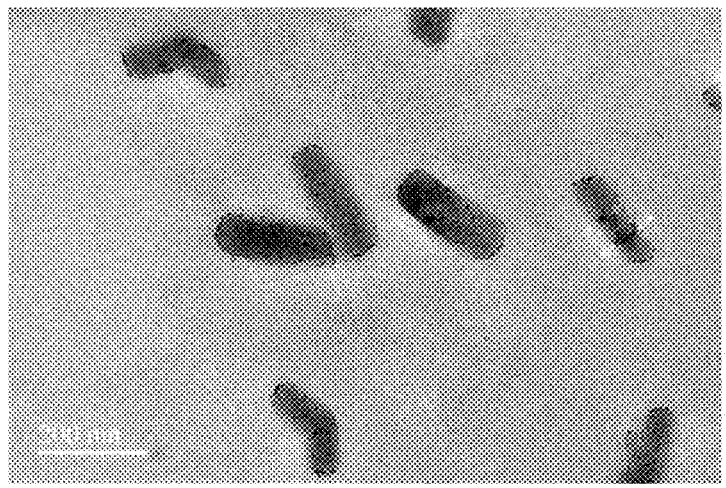
FIG. 13 is a TEM image of the fluorescent micelles prepared in Example 17 of the present disclosure (scale: 200 nm).

The fluorescent micelles prepared in Example 17 were characterized by TEM, and the specific results are shown in FIG. 13. It can be seen from FIG. 13 that the prepared fluorescent micelles have a worm-like shape and are regular, with a length distribution of 100 nm-280 nm and a width distribution of 18 nm-70 nm.

Example 18

In this example, fluorescent micelles were prepared by the following method:

poly(ether-ketone) and water were mixed at a stirring speed of 600 rpm for a stirring time of 15 min to obtain an aqueous solution of poly(ether-ketone) at a concentration of 5 mM, followed by vacuum distillation at a temperature of 120° C. for 48 h. After the reaction was finished, fluorescent micelles were directly obtained without any separation, wherein the binding efficiency of FCNs with micelles is 80%.

Example 19

In this example, fluorescent micelles were prepared by the following method:

Polyacrylamide and water were mixed at a stirring speed of 10 rpm for 60 min to obtain an aqueous solution of polyacrylamide at a concentration of 1000 mM, followed by rotary evaporation at a temperature of 120° C. for 0.1 h. After the reaction was finished, fluorescent micelles were directly obtained without any separation, wherein the binding efficiency of FCNs with micelles is 90%.

Example 20

In this example, fluorescent micelles were prepared by the following method:

2-oxooctanoic acid and water were mixed at a stirring speed of 100 rpm for 5 min to obtain an aqueous solution of 2-oxooctanoic acid at a concentration of 10 mM, followed by rotary evaporation at a temperature of 50° C. for 15 h. After the reaction was finished, fluorescent micelles were directly obtained without any separation, wherein the binding efficiency of FCNs with micelles is 99%.

Example 21

In this example, fluorescent micelles were prepared by the following method:

Dimethyl distearylammonium chloride and water were mixed at a stirring speed of 1000 rpm for 1 min to obtain an aqueous solution of arachidonic acid at a concentration of 240 mM, followed by atmospheric distillation at a temperature of 130° C. for 0.6 h. After the reaction was finished, fluorescent micelles were obtained without any separation, wherein the binding efficiency of FCNs with micelles is 98%.

Example 22

The only difference between the present example and Example 17 is that, nonoic acid is replaced with tetradecanoic acid, while the remaining operations of the preparation method are the same as that in Example 17. The fluorescent micelles were prepared, wherein the binding efficiency of FCNs with micelles is 90%.

Example 23

The only difference between the present example and Example 17 is that, nonoic acid is replaced with a mixture of nonoic acid and cetylic acid, while the remaining operations of the preparation method are the same as that in Example 17. The fluorescent micelles were prepared, wherein the binding efficiency of FCNs with micelles is 94%.

Example 24

The only difference between the present example and Example 17 is that, the concentration of the prepared aqueous solution of nonoic acid was 1 mM, and the fluorescent micelles were prepared after 65 h, wherein the binding efficiency of FCNs with micelles is (100%).

Example 25

The only difference between the present example and Example 17 is that, the concentration of the prepared aqueous solution of nonoic acid was 1010 mM, and the fluorescent micelles were prepared after 0.1 h. The yield of Example 25 was calculated, and it was found that the binding efficiency of FCNs with micelles decreased to only 78%.

The fluorescent micelles prepared in Examples 17-25 were subjected to stability test. "Standing Time (month)" in Table 1 means that the fluorescent micelles were still stable when the fluorescent micelles were allowed to stand for a certain number of months. The specific method is directly observing the shape of the fluorescent micelles and their binding rate by TEM). The resulting specific data are shown in Table 1 below:

TABLE 1

| Examples | Standing Time |
|---|---|
| 17 | 10 |
| 18 | 8.2 |
| 19 | 7.9 |
| 20 | 9.8 |
| 21 | 9.1 |
| 22 | 8.2 |
| 23 | 9.0 |
| 24 | 9.3 |
| 25 | 9.2 |

It can be found from the results of Examples 17-23 that the fluorescent micelles prepared by the preparation method provided by the present disclosure have high stability. Except for Examples 18-19, the fluorescent micelles of the remaining examples are stable after standing for 9-10 months, while nonoic acid, 2-oxooctanoic acid, dimethyl distearylammonium chloride and linoleic acid have higher stability and can allow standing for a longer time as compared to other amphiphilic molecules.

The applicant claims that the present disclosure illustrates the preparation methods and applications of the fluorescent nanomaterials of the present disclosure by the above examples, however, the present disclosure is not limited to the above process steps, that is, it does not mean that the present disclosure must rely on the above process steps to be implemented. It will be apparent to those skilled in the art that any modifications of the present disclosure, equivalent substitutions of the materials selected for the present disclosure, and additions of auxiliary ingredients, selections of the specific means and the like, are all within the protection and disclosure scopes of the present disclosure.

What is claimed is:

1. A preparation method of fluorescent nanomaterials, wherein the preparation method comprises: subjecting amphiphilic molecules in a solvent system to an illumination treatment and/or a heat treatment to obtain fluorescent nanomaterials;
wherein the amphiphilic molecules are subjected to an illumination treatment and then a heat treatment to obtain a mixture of hydrophilic fluorescent vesicles and hydrophobic fluorescent micelles.

2. The preparation method according to claim 1, wherein the fluorescent nanomaterials comprise any one selected from the group consisting of fluorescent vesicles, fluorescent micelles, fluorescent carbon nanoparticles, and a combination of at least two selected therefrom.

3. The preparation method according to claim 1, wherein the amphiphilic molecules comprise any one selected from the group consisting of a phosphatide, an aliphatic acid, an aliphatic alcohol, an aliphatic amine, an aliphatic aldehyde, a surfactant, a hyperbranched polymer, and a combination of at least two selected therefrom.

4. The preparation method according to claim 1, wherein the phosphatide comprises phosphoglyceride and/or sphingomyelin;
the aliphatic acid comprises any one selected from the group consisting of a short-chain aliphatic acid, a medium-chain aliphatic acid, a long-chain aliphatic acid, and a combination of at least two selected therefrom;
the aliphatic amine comprises any one selected from the group consisting of hexamethylenediamine, nonylamine, octylamine, octadecylamine, and a combination of at least two selected therefrom;
the aliphatic aldehyde comprises any one selected from the group consisting of valeraldehyde, nonaldehyde, octanaldehyde, and a combination of at least two selected therefrom;
the surfactant comprises any one selected from the group consisting of a cationic surfactant, an anionic surfactant, a nonionic surfactant, and a combination of at least two selected therefrom;
the hyperbranched polymer comprises any one selected from the group consisting of hyperbranched aromatic polyether ketone, methyl methacrylate, hyperbranched poly(amine-ester), hyperbranched polyphenyl, poly(ethylene glycol) methyl ether, and a combination of at least two selected therefrom.

5. The preparation method according to claim 4, wherein the cationic surfactant comprises any one selected from the group consisting of an amine-salt-type surfactant, a quaternary-ammonium-salt-type surfactant, a heterocyclic-type surfactant, an onium-salt-type surfactant, and a combination of at least two selected therefrom;
the anionic surfactant comprises any one selected from the group consisting of a polyacrylamide, a sulfonate, a sulfate, a phosphate, and a combination of at least two selected therefrom;
the nonionic surfactant comprises a polyoxyethylene-type surfactant and/or a polyol-type surfactant.

6. The preparation method according to claim 1, wherein the amphiphilic molecules are subjected to an illumination treatment to obtain fluorescent vesicles;

the fluorescent vesicles have a diameter of 9 nm-10 μm.

7. The preparation method according to claim 6, wherein the fluorescent vesicles are subjected to a treatment to obtain fluorescent carbon nanoparticles;

the fluorescent carbon nanoparticles have a diameter of 1 nm-100 nm;

the means of the treatment comprises: performing any one or at least two means selected from the group consisting of standing, centrifuging, dialyzing, adding a salt, extracting and chromatographic separation on the fluorescent vesicle solution, and destroying the vesicles to obtain fluorescent carbon nanoparticles.

8. The preparation method according to claim 1, wherein the amphiphilic molecules are subjected to a heat treatment to obtain fluorescent micelles;

the fluorescent micelles are subjected to a treatment to obtain fluorescent carbon nanoparticles;

the means of the treatment comprises: performing any one or at least two means selected from the group consisting of centrifuging, dialyzing, adding a salt, extracting and chromatographic separation on the fluorescent micelles, and destroying the micelles to obtain fluorescent carbon nanoparticles.

9. The preparation method according to claim 1, wherein the concentration of the amphiphilic molecules in the solvent system is 0.01 mM-1000 mM.

10. The preparation method according to claim 1, wherein the wavelength for the illumination treatment is 100 nm-2500 nm, and the illumination treatment is for a time of 0.1 h-100 h.

11. The preparation method according to claim 1, wherein the means of the heat treatment comprises any one selected from the group consisting of rotary evaporation, vacuum distillation and atmospheric distillation, the heat treatment is for a time of 0.1 h-48 h; and the temperature for the heat treatment is 30° C.-300° C.

12. The preparation method according to claim 1, wherein water is added to the mixture of hydrophilic fluorescent vesicles and hydrophobic fluorescent micelles, thereafter, oscillation and standing are performed for separation, and the hydrophilic fluorescent vesicles are obtained from the aqueous phase, while the hydrophobic fluorescent micelles are separated from the oil phase.

13. The preparation method according to claim 12, wherein the volume ratio of the mixture to the water is 0.2:1-10:1.

14. The preparation method according to claim 12, wherein the rate for the oscillation is 10 r/min-1000 r/min.

15. The preparation method according to claim 12, wherein a time for the standing is 0.5 h-100 h.

16. The preparation method according to claim 12, wherein the hydrophilic fluorescent vesicles have a diameter of 1 nm-1000 nm.

17. The preparation method according to claim 12, wherein the fluorescent micelles have a length of 1 nm-2000 nm;

the fluorescent micelles have a width of 1 nm-500 nm.

* * * * *